United States Patent
Tran

(10) Patent No.: US 11,535,636 B2
(45) Date of Patent: Dec. 27, 2022

(54) POTASSIUM MIXTURES COMPOSITIONS AND METHODS

(71) Applicant: Bo Tran, Chicago, IL (US)

(72) Inventor: Bo Tran, Chicago, IL (US)

( * ) Notice: Subject to any disclaimer, the term of this patent is extended or adjusted under 35 U.S.C. 154(b) by 29 days.

(21) Appl. No.: 16/194,384

(22) Filed: Nov. 18, 2018

(65) Prior Publication Data

US 2019/0152994 A1    May 23, 2019

Related U.S. Application Data

(60) Provisional application No. 62/588,325, filed on Nov. 18, 2017.

(51) Int. Cl.
| | |
|---|---|
| *C07F 1/06* | (2006.01) |
| *C01D 1/02* | (2006.01) |
| *C05D 1/00* | (2006.01) |
| *C05F 5/00* | (2006.01) |
| *C09K 3/22* | (2006.01) |
| *C09K 3/18* | (2006.01) |

(52) U.S. Cl.
CPC ............... *C07F 1/06* (2013.01); *C01D 1/02* (2013.01); *C05D 1/00* (2013.01); *C05F 5/006* (2013.01); *C09K 3/185* (2013.01); *C09K 3/22* (2013.01)

(58) Field of Classification Search
CPC .... C07F 1/06; C05D 1/00; C05D 1/02; C01D 1/02; C05F 5/006; C09K 3/22; C09K 3/185; Y02A 40/20; Y02W 30/40
See application file for complete search history.

(56) References Cited

U.S. PATENT DOCUMENTS

| | | | |
|---|---|---|---|
| 7,398,935 B2 | 7/2008 | Tran et al. | |
| 7,854,856 B2 | 12/2010 | Sapienza et al. | |
| 7,871,448 B2 | 1/2011 | Jackam et al. | |
| 8,163,059 B2 | 4/2012 | Tran et al. | |
| 8,728,177 B2 | 5/2014 | Jackam et al. | |
| 8,845,923 B2 | 9/2014 | Pylkkanen et al. | |
| 8,906,251 B2 | 12/2014 | Sapienza et al. | |
| 9,243,176 B2 | 1/2016 | Chauhan et al. | |
| 9,683,153 B2 | 6/2017 | Davis et al. | |
| 10,046,191 B1 | 8/2018 | Hernandez | |
| 2007/0277432 A1* | 12/2007 | Jackam | C10L 1/026 44/451 |
| 2009/0229464 A1* | 9/2009 | Robertson | C10K 1/16 95/186 |
| 2009/0275787 A1* | 11/2009 | Forster | C07C 29/74 568/903 |

OTHER PUBLICATIONS

Sims, Bryan. "Clearing the Way for Byproduct Quality: Why quality for glycerin is just as important for biodiesel." Biodiesel Magazine. Oct. 25 (2011).*
Gerpen, Jon, et al. "Biodiesel production technology." National renewable energy laboratory 1617 (2004): 80401-3393.*
REG Glycerin. "Glycerin Fact Sheet". Aug. 2018 <https://www.regi.com/docs/default-source/factsheets/reg-18114_ glycerin_fact_sheet_update.pdf?sfvrsn=62160d1_2>.*
Huth, Hans. "Biodiesel 101" An Introductory Guide for Brewing and Using Biodiesel in Arizona. Biodiesel Basics and Homebrewing Guide Version 1.5 <http://www.biod101.com/> Apr. 2, 2013 (Year: 2013).*

* cited by examiner

*Primary Examiner* — Jennifer A Smith
(74) *Attorney, Agent, or Firm* — Michael B. Martin

(57) ABSTRACT

Composition and methods of applying potassium mixtures are disclosed. Applications include: fertilizer and fertilizer additives, freeze conditioning, dust control, coating oil, and fire prevention.

9 Claims, No Drawings

POTASSIUM MIXTURES COMPOSITIONS AND METHODS

CROSS REFERENCE TO RELATED APPLICATIONS

This application claims benefit of U.S. provisional application No. 62/588,325 filed Nov. 18, 2017, incorporated herein by reference.

TECHNICAL FIELD

This invention provides economical, safe alternative compositions to many applications such as fertilizer, fertilizer additive, dust control, coating oil, freeze conditioning, oxidizer, and fire resistance. This invention uses generally a waste material comprising potassium mixtures in many commercial applications.

BACKGROUND OF THE INVENTION

Potassium is widely used as a nutrient promoting plant growth. It is needed to complete many essential functions in plants, such as activating enzyme reactions, synthesizing proteins, forming starch and sugars, and regulating water flow in cells and leaves. Typical forms of potassium fertilizers are potassium chloride and potassium sulfate. The present invention provides an alternative potassium source that is safe and economical.

Potassium acetate is a known deicing reagent applied by many industries and municipalities. For example, airports may spray potassium acetate to deice or prevent icing of runways. However, the selling price of potassium acetate ranks among the highest of all the deicing reagents marketed. There needs to be an economical alternative. The present invention offers an economic alternative.

Freeze conditioning agents (FCA) such as calcium chloride, glycols, glycerol, and sugar derivatives are applied in the coal industry to transload coal from rail cars in freezing weather. These products are costly, toxic, and/or contain chloride ie., sodium chloride. Sodium chloride is harmful to the environment and is corrosive. The present invention offers a safe, economic alternative FCA.

Dust control reagents currently marketed are mainly petroleum-based, or water solutions containing chloride such as inorganic salts. Inorganic salts are harmful to the environment and are corrosive. The present invention offers a safe, non-chloride based, economical alternative.

Other applications of the present inventions are described below.

SUMMARY OF THE INVENTION

In an aspect, this invention relates to fertilizer and fertilizer additive compositions for application to soil and fertilizer compositions, said fertilizer and fertilizer additive compositions comprising by-product or waste potassium mixtures produced from natural fats and oils processing plants, wherein the potassium mixtures comprise one or more components selected from potassium acetate, potassium oleate, and potassium superoxide.

In certain embodiments, the fertilizer and fertilizer additive compositions further comprise one or more components selected from potassium, potassium salts, ash, glycerol, methanol, fatty acids, moisture, sodium, phosphorus, calcium, and magnesium. In other embodiments, the fertilizer and fertilizer additive compositions comprise by weight one or more components selected from about 10-60% ash, about 30-80 glycerol, <1% methanol, <1% moisture, about 2-60% potassium, </=30% fatty acids, about 0-10% fatty acid methyl esters, <1% sodium, <1% phosphorus, <1% calcium, and <1% magnesium. In other embodiments, the fertilizer and fertilizer additive compositions are diluted with water from about 10% to about 1,000% by weight or by volume. In other embodiments, the fertilizer and fertilizer additive compositions do not contain chloride.

In another aspect, this invention is deicing and freeze conditioning agent (FCA) compositions, comprising by-product or waste potassium mixtures produced from natural fats and oils processing plants, wherein the potassium mixtures comprise one or more components selected from potassium acetate, potassium oleate, and potassium superoxide.

In other certain embodiments, the deicing and freeze conditioning agent (FCA) compositions further comprise one or more components selected from potassium, potassium salts, ash, glycerol, methanol, fatty acids, moisture, sodium, phosphorus, calcium, and magnesium. In other embodiments, the deicing and freeze conditioning agent (FCA) compositions comprise by weight one or more components selected from about 10-60% ash, about 30-80 glycerol, <1% methanol, <1% moisture, about 2-60% potassium, </=30% fatty acids, about 0-10% fatty acid methyl esters, <1% sodium, <1% phosphorus, <1% calcium, and <1% magnesium.

In other embodiments, the deicing and freeze conditioning agent (FCA) compositions are diluted with water from about 10% to about 1,000% by weight or by volume. In other embodiments, the deicing and freeze conditioning agent (FCA) compositions do not contain chloride.

In another aspect, this invention is dust control compositions, said dust control compositions comprising by-product or waste potassium mixtures produced from natural fats and oils processing plants, and wherein the potassium mixtures comprise one or more components selected from potassium acetate, potassium oleate, and potassium superoxide.

In other certain embodiments, the dust control compositions further comprise one or more components selected from potassium, potassium salts, ash, glycerol, methanol, fatty acids, moisture, sodium, phosphorus, calcium, and magnesium. In other embodiments, dust control compositions comprise by weight one or more components selected from about 10-60% ash, about 30-80 glycerol, <1% methanol, <1% moisture, about 2-60% potassium, </=30% fatty acids, about 0-10% fatty acid methyl esters, <1% sodium, <1% phosphorus, <1% calcium, and <1% magnesium. In other embodiments, dust control compositions are diluted with water from about 10% to about 1,000% by weight or by volume. In other embodiments, the dust control compositions do not contain chloride.

DETAILED DESCRIPTION OF THE INVENTION

This invention relates generally to methods and compositions of using an industrial waste in many applications. More specifically, the present invention relates to utilizing potassium mixtures generated from industrial processes including distillate residue or waste produced from natural fats and oils processing. The potassium mixtures are not regulated as hazardous materials, a benefit in its applications.

The potassium mixtures of the present invention comprise potassium acetate, potassium oleate, and potassium superoxide. Other components of the potassium waste stream include glycerol, methanol, fatty acids, moisture, sodium, phosphorus, calcium, and/or magnesium.

It is known that potassium acetate can be used as a fertilizer or fertilizer component. There are numerous commercial brands of potassium acetate fertilizers.

Potassium superoxide is an oxidizer—it can release oxygen promoting microbial growth in soil and fertilizers. This activity can promote plant growth.

Potassium acetate is also a freeze point depressant that can be used in freeze conditioning applications. Commercially available potassium acetate touts its application to deice airplane runways, bridges, or where there is a sensitive environmental concern. Potassium acetate has excellent anti-icing and deicing characteristics, is active at low temperatures (−20° F. and below) and is less slippery than glycol-based products.

Potassium acetate also has been used in fire extinguishers as an extinguishing agent. The present invention can be used to prevent fire by applying it to a combustible material including vegetations. Fire prevention refers to preventing fire or putting out fire. As an example, the potassium mixtures (diluted in water) can be sprayed on coal or vegetation to prevent or put out fire.

Other applications of this invention include dust control and a coating oil for particles, solids, and fertilizers. The potassium mixtures are hygroscopic which aids in dust control. The potassium mixtures can be applied in grinding of particulates (including cement clinkers, mineral ores), drilling operations, and food preservation.

Dust control refers to preventing dust generation from handling of minerals or other solid particles, or from wind generation of dust particles. Dust can form from roads or other operations that generate dust. In an embodiment the potassium mixture stream is applied as a coating oil. Fertilizer pellets or granules and iron ore pellets can generate dust. To prevent dust or to improve particle or pellet flow, or to prevent stickiness or agglomeration, a coating oil is applied.

The present invention can be sprayed onto surfaces or particles, or dirt roads, where dust can generate. In embodiment about one pint to about one quart can be applied to a square yard of dirt road to prevent dust generation. The stream can be diluted from 10% to 1,000% with water by weight or by volume.

In an embodiment the potassium mixtures can be applied as a foam or mist. Surfactant can be added to foam the mixtures.

Methods and compositions for dust control and freeze conditioning are taught in U.S. Pat. No. 7,398,935, Tran et, al. The present invention can be applied to fine coal to prevent dust and to prevent its agglomeration, or icing together, in freezing weather. In addition, it can be applied to other particulate materials requiring similar treatment. The present invention can be applied to dirt or dusty roads, areas generating dust, piles or debris to prevent or mitigate dust.

Coating oil applications are taught in U.S. Pat. No. 8,163,059, Tran et, al. The coating composition may suitably be applied to any organic or inorganic particulate solid capable of caking or generating dust when disturbed, handled or processed. The present invention can control dust from particulate materials including farm products, corn, coal, wood chips, fertilizers, iron ore pellets, mineral ores, sand and gravel, cement, concrete, soil, construction debris, dirt and aggregates.

Typical fertilizers to which a coating oil comprising the potassium mixtures can be applied include monoammonium sulfate ("MAP"), diammonium phosphate ("DAP"), trisuperphosphate ("GTSP"), calcium phosphate, ammonium nitrate, potassium nitrate, potassium chloride, potassium sulfate, and the like, and blends thereof. The fertilizer may be in granular, pelletized, crushed, compacted, crystalline or prilled form.

The potassium mixtures can be used as a grinding aid. Cement clinkers can be grinded using the potassium mixtures as a grinding aid. Water and/or other grinding aids commercially available may be added to the mixtures. Additives such as cement or concrete set time accelerators or set time inhibitors can be added to the mixtures. Mortar and/or concrete strength enhancement additive can be combined with the mixtures.

The present invention can promote microbial activity. Microbes can use the potassium acetate as a food source. Promoting microbial growth using the present invention can be applied to: research and development work relating to the health or pharmaceutical fields and treating waste, hazardous chemicals, or toxic chemicals. The present invention can be used to treat (including digestion and degradation of) industrial or municipal waste, liquids or solid waste.

This invention relates generally to methods and compositions of potassium waste streams that can be used in many applications. More specifically, the present invention relates to potassium mixtures generated as waste, or have minimum value, and using this useful waste in many applications. The benefits are providing economical compositions and reducing waste disposal, including eliminating handling, transportation and disposal costs. There are other benefits: these compositions do not have to be manufactured in typical, generally recognized commercial processes, that consume resources and perhaps pollute the environment.

U.S. Pat. No. 7,871,448, Jackam, et, al, teaches one industrial process that can generate a potassium mixture waste useful in the compositions of the invention. Production of fatty acid alkyl ester (FAAE) and glycerol from low-value high free fatty acid feedstock is described utilizing multiple steps or unit operations. This patent teaches a unique novel process utilizing many unit operations not used in other production processes of FAAE and glycerol. Another uniqueness is that it utilizes low-value high free fatty acid feedstocks for economical benefit, again not typically used by other production processes of FAAE and glycerol. Free fatty acids can impair production of FAAE and glycerol, and the general industry practice is to utilize glyceride feedstocks containing minimum free fatty acids. Contemporary commercial process typically use feedstock that has a maximum of 15% free fatty acid. The patented process preferably uses feedstocks having up to 100% free fatty acids that are much lower in cost. Processing low-value high free fatty acids feedstocks requires unique unit operations.

Potassium methoxide is used as a catalyst in the production of FAAE and glycerol and ultimately the potassium becomes part of the potassium mixtures of the present invention.

The production process taught in U.S. Pat. No. 7,871,448 utilizes unit operations that include a "reactive" distillation process, wherein the FAAE stream undergoes both physical separation and chemical reaction. To further purified the FAAE the stream undergoes a second distillation unit operation.

Other unique unit operations described in U.S. Pat. No. 7,871,448 include utilizing wiped film evaporators in parallel, falling film evaporators in parallel, freeze crystallization, and a glycerolysis reactor. The process is continuous, not batch, as typically practiced by other manufacturers. Other improvements discussed include generating a second FAAE and by-product streams, and purifying these streams using freeze crystallization.

Moreover, U.S. Pat. No. 7,871,448 describes a process using lower operating conditions (such as pressure) than other commercial production process. Waste is minimized.

The process as described above generates potassium mixtures. The mixtures and or its components can be generated from any of the unit operations. The potassium mixtures are concentrated and is referred to as distillate residue, bottoms material, and/or waste material. This waste stream, or minimum value stream, is the subject of this invention. It comprises potassium mixtures and other components.

Possible components of the potassium mixtures include: potassium, potassium salts, potassium acetate, potassium oleate, potassium superoxide, ash, glycerol, methanol, moisture, fatty acids, sodium, phosphorus, calcium, and magnesium.

Concentration ranges by weight of specific components are as follows:

| | |
|---|---|
| Ash | 10-60% |
| Glycerol | 30-80% |
| Methanol | <1% |
| Moisture | <1% |
| Potassium | 2-60% |
| Total fatty acids | </=30% |
| Fatty acid methyl esters | 0-10% |
| Sodium | <1% |
| Phosphorus | <1% |
| Calcium | <1% |
| Magnesium | <1% |

It is noted that potassium is concentrated in the ash. In an embodiment the ash comprises potassium superoxide.

The potassium mixtures are highly viscous at room temperature. Pumping using normal means would be extremely difficult if not impossible. Heat is needed to transfer the potassium mixtures as is. The processor or manufacturer reports the potassium mixtures are partially miscible in water; however, upon continuous mixing with water, the mixtures can be solubilized—this is unexpected. For example, at about 60 (potassium mixtures):40 (water) percent by volume the potassium mixtures solubilized with stirring. Similarly, at 20% mixtures and 80% water by volume, the mixtures solubilized with stirring. Preferably three minutes or longer of stirring or mixing is needed. Filtration may be required to remove any solid particles remaining.

Physical characteristics of the potassium mixtures are:

| | |
|---|---|
| Freeze point | 0° C. (32° F.) about |
| Flash point | >150° C. (>302° F.) |
| VOC | nil |

It is important to note that when mixed with water (about 60% mixtures to about 40% water by volume) the freeze point of the potassium mixture-water solution is less than about minus 16° C. or 4° F. When mixed with about 80% water (about 20% potassium mixtures) by volume, the potassium mixture-water blend forms a soft ice blend at about minus 16° C. or 4° F.

In another example, the potassium mixture was diluted with about 50% by volume of tap water: The freeze point of the blend is less than minus 16° C. or 4° F. (potassium mixture-water blend did not freeze at about minus 16° C. or 4° F.). When the potassium mixture was mixed with about 75% water by volume (about 25% potassium mixture by volume), the potassium mixture-water blend formed a slush, soft ice blend at about minus 16° C. or 4° F. In these examples the potassium mixtures comprised: 21% ash, 46% glycerol, 0.15% methanol, 0.05% moisture, 13% potassium, 7% fatty acids.

Per published data (Dow Company, www.dow.com) a straight 25% glycerol-water solution would have a freeze point of minus 7° C. or 19° F. In the above example the freeze point of the potassium mixture-water blend containing about 23% glycerol did not freeze at minus 16° C. or 4° F.

The unexpected formation of soft ice is very important in freeze conditioning applications. For example, if the potassium mixtures and water blend is sprayed onto coal it can prevent the coal from agglomerating in freezing weather, allowing the coal to be transferred, including unloading the coal from railcars. Coal or solids can be transferred or transported, and not form a large frozen mass which makes transloading difficult if not impossible.

It is important to note ice may form in freeze conditioning applications of the potassium mixtures, but the ice crystals are soft preventing the icing together or agglomeration of particles including coal. The potassium and water blend can be applied similarly to any particulate material that needs to be freeze conditioned during the winter or in cold weather.

Without being limited by theory, it is believed that freeze conditioning results from a weakening of the bonds between forming ice crystals which prevent agglomeration of the particulate material into a solid mass. Thus although water contained in the particulate material is frozen in a typical application, the particulate material does not freeze into a solid mass.

Freeze conditioning is therefore distinct from deicing or anti-icing. For purposes of this application, the definition of "deicing" is a process in which formed ice is converted to water by depressing the freezing point depression of the ice. For purposes of this application, the definition of "anti-icing" is a process in which an agent is applied to a surface or material to prevent formation of ice when the surface or material is contacted by precipitation. Most importantly, the dosage required for freeze conditioning is substantially lower than the dosage required for deicing or anti-icing. In at least one embodiment the potassium mixture composition is applied to particulate materials under conditions such that (so cold that) and in a dosage such that the composition is ineffective as a deicing agent or anti-icing agent but is effective as a freeze conditioning agent.

Different types of water can be use to blend with the potassium mixtures, including tap water, distilled water, deionized water, wastewater, runoffs, process water, or contaminated water including industrial flowback water and/or produced water, treated or untreated. pH adjustment and/or filtration maybe required. The produced water can be generated from mining, natural gas, fracking, geothermal energy, or drilling operations. Flowback water and produced water are described in U.S. Pat. No. 9,683,153, Davis, et al.

The potassium mixtures can be used in freeze conditioning and deicing/anti-icing applications. It can be mixed or blended with other freeze point depressants or deicing/anti-icing materials including glycols, sugar-beets formulation, sugared/desugared formulas, and/or inorganic salts.

In an embodiment the potassium mixtures or dilution of the mixtures can be applied from about 1 to about 4 pints per ton of coal for freeze conditioning. Dosages less than 1 pint per ton of coal are possible due to the soft ice formation. Extreme cold weather may require a higher dosage.

In an embodiment, additives can be added to the potassium mixtures including corrosion inhibitors. In an embodiment the pH of the potassium mixtures ranges from 6-12. In an embodiment the pH of the potassium mixtures ranges from 10-12. High pH can mitigate corrosion. The mixtures can be diluted with water as mentioned above.

In embodiment the potassium mixtures can be applied to roads or structures to prevent icing in freezing weather. The stream can be diluted with water from about 10% to about 1,000% by weight or by volume in the applications referenced of the present invention. In freeze conditioning applications, it may be possible to dilute the potassium mixtures by greater than 1,000% by volume or weight with water due to the soft ice formation.

Another unique, beneficial characteristic of the potassium mixture is it does not contain chloride. Production of FAAE and glycerol from other commercial processes generates streams including by-products that contain chloride, particularly sodium chloride. The existence of sodium chloride in by-product streams is noted in Tran's patents referenced above. The present invention having no chloride is beneficial with regards to the applications of this invention. Chloride damages vegetation and the environment, and is harmful to fish, pets, and wildlife. Chloride also causes corrosion to equipment, structures, bridges, and vehicles. Structures can include steel and concrete.

Another beneficial characteristic of the present invention is it lacks water or moisture. Typical moisture level of the potassium mixtures is about 0.06% by weight. These are concentrated mixtures that can be diluted in applications mentioned in the present inventions. By-products from production of FAAE and glycerol from other commercial processes typically comprise a large portion of water, for example, about 20-30% water or more. These products can be used directly in commercial applications. A distinguishing characteristic of the potassium mixtures is that it is very viscous and it freezes at typical water freeze temperatures, making the mixtures very difficult to use directly or apply as is. In an embodiment heat is provided or water is added to improve flow.

It is noted that commercially available compositions are prepared by mixing glycerol and potassium acetate (commercially made) together. The present invention offers an economical benefit by employing a waste residue that comprises both components. It is also noted that sellers of similar commercially available compositions suggest adding a corrosion inhibitor because of the chloride content in by-product glycerol. The present invention offers another benefit in that it does not contain any chloride that can promote corrosion.

The Version and Claims of the Invention Discussed Here Includes:
Compositions and methods for freeze conditioning comprising the potassium mixtures.
Compositions and methods for deicing comprising the potassium mixtures.
Compositions and methods for dust control comprising the potassium mixtures.
Compositions and methods for coating oil wherein the coating oil comprises the potassium mixtures.
Compositions and methods for grinding particles and improving particle flow comprising the potassium mixtures.
Compositions and methods for providing fertilizers and fertilizer additives comprising the potassium mixtures.
Compositions and methods for providing drilling fluids and corrosion control comprising the potassium mixtures.
Compositions and methods for providing food preservation comprising the potassium mixtures.
Compositions and methods for fire prevention or extinguishing fire comprising the potassium mixtures.
Compositions and methods for applying the present invention as a freeze point depressant of another liquid or material.
Compositions and methods for combining the present invention with other freeze point depressants or deicing and anti-icing material liquid or solid, including inorganic salts.
Compositions and methods for utilizing the potassium acetate mixtures to feed microbes.
Compositions and methods for utilizing the potassium acetate mixtures to feed microbes to promote digestion, including degradation of waste and hazardous or toxic chemicals.

In an embodiment the potassium mixtures can be applied as a liquid, foam, mist, or solid. Surfactant can be added to foam the stream.

In an embodiment, a pastillation process can be use to change the characteristic of the potassium mixtures into solid forms. Solid forms can improve handling and application. In an embodiment, the potassium mixture can be solidified and applied as a solid, for example in pellet, briquette, bead, or granular form. Methods of solidification can comprise using a pastillation technology, and/or mixing with another material including any binder to provide solidification.

In an embodiment the potassium mixture of the present invention comprises by weight 15%-30% ash and 35%-60% glycerol.

In an embodiment the potassium level of the present invention is about 5% to 30% by weight.

In an embodiment, the weight percent of components is as follows: ash 15-30%, glycerol 35-60%, methanol <0.3%, moisture <0.5%, potassium 8-20%, total fatty acids <20%; and sodium, phosphorus, calcium, and magnesium combined is less than 0.5%.

In an embodiment, the weight percent of components of the potassium mixture is about as follows: ash 15-25%, glycerol 40-50%, methanol 0.1-0.2%, moisture 0.03-0.07%, potassium 5-15%, total fatty acids 4-9%.

In an embodiment, the potassium mixtures can be diluted from about 10% to about 1,000% by weight or volume with water for use in the applications referenced above.

It is therefore novel, useful and non-obviousness to provide and utilize cost-effective, non-hazardous, and effective potassium mixtures in the applications described above. The art described herein is not intended to constitute an admission that any patent, publication or other information referred to herein is prior art with respect to this invention, unless specifically designated as such. In addition, this section should not be construed to mean that a search has been made or that no other pertinent information as defined in 37 CFR .sctn.1.56(a) exists.

While the present invention is described above in connection with representative or illustrative embodiments, these embodiments are not intended to be exhaustive or limiting of the invention. Rather, the invention is intended to cover all alternatives, modifications and equivalents included within its spirit and scope, as defined by the appended claims.

While this invention may be embodied in many different forms, there are shown in and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Fertilizer and fertilizer additive compositions for application to soil and fertilizer compositions, said fertilizer and fertilizer additive compositions comprising distillate residue, bottoms material and/or waste potassium mixtures produced in natural fats and oils processing plants that produce biodiesel from low value high fatty acid feedstocks in a continuous process comprising one or more unit operations selected from reactive distillation, wiped-film evaporation, falling film evaporation, freeze crystallization, and glycerolysis, wherein the distillate residue, bottoms material and/or potassium mixtures comprise about 10% to about 60% ash, and one or more of potassium acetate, potassium oleate and potassium superoxide, wherein said fertilizer composition comprises fertilizer and the distillate residue, bottoms material and/or waste potassium mixtures, wherein the fertilizer additive composition is prepared by heating the distillate residue, bottoms material and/or waste potassium mixtures and mixing with sufficient water to prepare a composition having improved flow, or by mixing the distillate residue, bottoms material and/or waste potassium mixtures with about 10% to about 1,000% by weight or by volume water, and wherein the compositions are a food source for microbes, wherein the compositions promote microbial activity and wherein the microbes digest and degrade the composition.

2. Fertilizer and fertilizer additive compositions of claim 1 further comprising one or more of potassium, potassium salts, glycerol, methanol, fatty acids, moisture, sodium, phosphorus, calcium, and magnesium.

3. Fertilizer and fertilizer additive compositions of claim 1 wherein the distillate residue, bottoms material and/or waste potassium mixtures comprise by weight about 10-60% ash, about 30-80 glycerol, <1% methanol, <1% moisture, about 2-60% potassium, </=30% fatty acids, about 0-10% fatty acid methyl esters, <1% sodium, <1% phosphorus, <1% calcium, and <1% magnesium.

4. Food source compositions for microbes, said food source compositions comprising distillate residue, bottoms material and/or waste potassium mixtures produced in natural fats and oils processing plants that produce biodiesel from low value high fatty acid feedstocks in a continuous process comprising one or more unit operations selected from reactive distillation, wiped-film evaporation, falling film evaporation, freeze crystallization, and glycerolysis, wherein the distillate residue, bottoms material and/or potassium mixtures comprise about 10% to about 60% ash, and one or more of potassium acetate, potassium oleate and potassium superoxide, wherein said food source compositions are prepared by heating the distillate residue, bottoms material and/or waste potassium mixtures and mixing with sufficient water to prepare a composition having improved flow, or by mixing the distillate residue, bottoms material and/or waste potassium mixtures with about 10% to about 1,000% by weight or by volume water, and wherein the composition is a food source for microbes, and wherein the composition promotes microbial activity and wherein the microbes digest and degrade the composition.

5. The food source compositions for microbes of claim 4 further comprising one or more of potassium, potassium salts, glycerol, methanol, fatty acids, moisture, sodium, phosphorus, calcium, and magnesium.

6. The food source compositions for microbes of claim 4 wherein the distillate residue, bottoms material and/or waste potassium mixtures comprise by weight about 10-60% ash, about 30-80 glycerol, <1% methanol, <1% moisture, about 2-60% potassium, </=30% fatty acids, about 0-10% fatty acid methyl esters, <1% sodium, <1% phosphorus, <1% calcium, and <1% magnesium.

7. Deicing and freeze conditioning agent (FCA) compositions, said deicing and FCA compositions comprising distillate residue, bottoms material and/or waste potassium mixtures produced in natural fats and oils processing plants that produce biodiesel from low value high fatty acid feedstocks in a continuous process comprising one or more unit operations selected from reactive distillation, wiped-film evaporation, falling film evaporation, freeze crystallization, and glycerolysis, wherein the distillate residue, bottoms material and/or potassium mixtures comprise about 10% to about 60% ash, and one or more of potassium acetate, potassium oleate and potassium superoxide and wherein said deicing and freeze conditioning agent compositions are prepared by heating the distillate residue, bottoms material and/or waste potassium mixtures and mixing with sufficient water to prepare a composition having improved flow, or by mixing the distillate residue, bottoms material and/or waste potassium mixtures with about 10% to about 1,000% by weight or by volume water, and wherein said compositions are a food source for microbes, wherein the compositions promote microbial activity and wherein the microbes digest and degrade the composition.

8. Deicing and freeze conditioning agent (FCA) compositions of claim 7 further comprising one or more of potassium, potassium salts, glycerol, methanol, fatty acids, moisture, sodium, phosphorus, calcium, and magnesium.

9. Deicing and freeze conditioning agent (FCA) compositions of claim 7 wherein the distillate residue, bottoms material and/or waste potassium mixtures comprise by weight about 10-60% ash, about 30-80 glycerol, <1% methanol, <1% moisture, about 2-60% potassium, </=30% fatty acids, about 0-10% fatty acid methyl esters, <1% sodium, <1% phosphorus, <1% calcium, and <1% magnesium.

* * * * *